US009124596B2

(12) United States Patent
Yook et al.

(10) Patent No.: US 9,124,596 B2
(45) Date of Patent: Sep. 1, 2015

(54) NETWORK DEVICE AND METHOD AVAILABLE FOR USE UNDER NON-SECURITY MODE

(75) Inventors: Hyun-gyoo Yook, Seoul (KR); Yeon-ho Jin, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2919 days.

(21) Appl. No.: 10/843,576

(22) Filed: May 12, 2004

(65) Prior Publication Data

US 2005/0044415 A1    Feb. 24, 2005

(30) Foreign Application Priority Data

Aug. 7, 2003 (KR) .................. 10-2003-0054792

(51) Int. Cl.
*G06F 21/00* (2013.01)
*H04L 29/06* (2006.01)
*H04L 12/28* (2006.01)

(52) U.S. Cl.
CPC ............ *H04L 63/102* (2013.01); *H04L 63/104* (2013.01); *H04L 12/2803* (2013.01)

(58) Field of Classification Search
CPC .................................................. G06Q 20/382
USPC ............................................................ 705/50
See application file for complete search history.

(56) References Cited

U.S. PATENT DOCUMENTS 4,740,890 A * 4/1988 William ........................... 726/31
5,237,612 A * 8/1993 Raith ............................. 380/247
5,266,782 A * 11/1993 Alanara et al. ................ 235/380
5,444,764 A * 8/1995 Galecki ......................... 455/411
5,898,783 A * 4/1999 Rohrbach .................... 340/5.31
5,913,175 A * 6/1999 Pinault .......................... 455/558
6,725,303 B1 * 4/2004 Hoguta et al. ................ 710/106

(Continued)

FOREIGN PATENT DOCUMENTS

JP    09-114786 A    5/1997
JP    2002-077143    3/2002

(Continued)

OTHER PUBLICATIONS

European Patent Office, Search and Examination Report, Jun. 5, 2007.*

(Continued)

*Primary Examiner* — Jason Dunham
*Assistant Examiner* — Alexis Casey
(74) *Attorney, Agent, or Firm* — Sughrue Mion, PLLC

(57) ABSTRACT

The present invention relates to a network device and method available for use in non-secure use mode. A network device according to the present invention includes an ownership establishment determination unit for determining whether ownership has been established in the network device and establishing either a secure or non-secure use mode, upon reception of a use request message from a user through a control unit; and a non-secure use range search unit for searching for a non-secure use range available in non-secure use mode, if the ownership establishment determination unit determines the establishment of the non-secure use mode, and granting the user a license for the searched non-secure range. According to the present invention, there is an advantage in that a license for an appropriate range of content of a secure network device can be granted to a user even during the initial construction stage of a home network.

13 Claims, 5 Drawing Sheets

(56) References Cited

U.S. PATENT DOCUMENTS

| | | | |
|---|---|---|---|
| 7,693,795 B2* | 4/2010 | Yamamichi et al. | 705/52 |
| 2001/0030235 A1* | 10/2001 | Hedemann et al. | 235/451 |
| 2001/0047485 A1* | 11/2001 | Brown et al. | 713/201 |
| 2002/0180581 A1 | 12/2002 | Kamiwada et al. | |
| 2003/0063771 A1 | 4/2003 | Morris et al. | |
| 2003/0097452 A1* | 5/2003 | Kim et al. | 709/229 |
| 2003/0097655 A1* | 5/2003 | Novak | 725/31 |
| 2003/0126243 A1* | 7/2003 | Kudo et al. | 709/222 |
| 2003/0167236 A1* | 9/2003 | Stefik et al. | 705/51 |
| 2003/0204748 A1* | 10/2003 | Chiu | 713/201 |

FOREIGN PATENT DOCUMENTS

| | | |
|---|---|---|
| JP | 2002-271309 | 9/2002 |
| JP | 2003-085135 A | 3/2003 |
| JP | 2003-108254 | 4/2003 |
| JP | 2003-162616 | 6/2003 |
| JP | 2003-186558 A | 7/2003 |
| KR | 1998-037017 A | 8/1998 |
| KR | 2002-0022317 A | 3/2002 |
| KR | 2002-0042305 A | 6/2002 |
| KR | 2003-0011080 A | 2/2003 |

OTHER PUBLICATIONS

R. Sandhu et al., "Access Control: Principles and Practice", IEEE Communications Magazine, IEEE Service Center, Picataway, NJ, US, vol. 32, No. 9, Sep. 1, 1994, pp. 40-48.*

R. Sandhu et al., "Access Control: Principles and Practice", IEEE Communications Magazine, IEEE Service Center. Piscataway, N.J, US, vol. 32, No. 9, Sep. 1, 1994, pp. 40-48, XP000476554.

* cited by examiner

NETWORK DEVICE AND METHOD AVAILABLE FOR USE UNDER NON-SECURITY MODE

BACKGROUND OF THE INVENTION

This application claims priority from Korean Patent Application No. 10-2003-0054792, filed on Aug. 7, 2003, at the Korean Intellectual Property Office, the disclosure of which is incorporated herein in its entirety by reference.

FIELD OF THE INVENTION

Devices and methods consistent with the present invention relate to a network device and method available for use under a non-security mode, and more particularly, to a network device and method available for use under a non-security mode, wherein a network device whose security has been established (hereinafter referred to as "secure device") can be used in an appropriate manner even during an initial installation stage of a network by allowing it to use contents falling in a range available for use under a non-security mode (hereinafter referred to as "non-secure use range") through a means for authorizing use of the contents under a non-security mode (hereinafter referred to as "non-secure use authorizing means") even though the ownership of the secure network device has not yet been registered.

DESCRIPTION OF THE PRIOR ART

Generally for a home network, a common virtual computing environment, usually called "middleware," is established for a variety of network devices which are present on a private network based on Internet Protocol (hereinafter referred to as "IP") and then service applications whose services are available through the respective network devices are provided.

The service applications are established with security functions for which only registered users can use the contents according to the contents serviced through the network devices.

To use a network device with a service application whose security function is established, each of the devices constituting the home network is provided with a unit to register the ownership thereof (hereinafter referred to as "ownership registration unit").

Through the ownership registration unit, a user who has the ownership of a secure device and is authorized to use a service application of the secure device is registered and then granted a license to authorize only the authorized user to use the service application of the secure device.

A conventional network system constructed as described above and its operation will be described with reference to the accompanying drawings.

FIGS. 1a, 1b and 1c schematically illustrate configurations of a conventional network system and a secure device, and the method of using the secure device.

In the conventional network system, if a secure device 20 is for the first time, installed or attempted to be used, the ownership registration unit 30 registers the ownership of the secure device 20 in the secure device 20, as shown in ① of FIG. 1a.

When registration of the ownership is established, a user requests the ownership registration unit 30 to grant a license to use the secure device 20 through a control unit 10 (②), and the ownership registration unit 30 then creates a license to use the secure device 20, for the user, and registers the license in the secure device 20 (③).

After the license has been registered, the user may use the secure device 20 via the control unit 10 (④).

As shown in FIG. 1b, the secure device 20 comprises an ownership database (DB) 11 and a license database (DB) 13 for storing the ownerships and licenses, respectively, a request reception unit 12, a license verification unit 14, an error response unit 15, a request processing unit 16, and a request response unit 17.

When the secure device 20 receives a message to request use of the secure device 20, from the user via the control unit 10 (S1), the secure device 20 searches for information on the license therefor by referring to the license DB 13 (S2), as shown in FIG. 1c.

Then, the secure device 20 determines whether the user has been authorized to use the secure device 20, based on the searched license and the use request message sent by the user via the control unit (S3).

In other words, it is determined whether the range of use requested by the message exceeds a use range allowed by the searched license.

If it is determined that the user has been authorized to use the secure device 20, the use request message received from the user is transmitted to the request processing unit 16 for processing the use request message.

On the contrary, if it is determined that the user has not been authorized to use the secure device 20, an error message is sent to the user through the error response unit 15.

If an error occurs when the request processing unit 16 processes the use request message, an error message is sent to the user through the error response unit 15. If there is no error, a response message is sent to the user through the request response unit 17.

As described above, the secure device 20 of the conventional home network system can be used under the assumption that the ownership thereof has been registered and a license has been granted by the ownership registration unit 30.

Therefore, if registration of the ownership is not established in the secure device, the license thereof would be restricted and thus it is impossible to use the secure device.

Furthermore, if a secure device and an ownership registration unit are not distributed simultaneously at the initial installation stage of a home network which the ownership registration unit has not yet been provided, there may cause a situation that a user is not allowed to use a purchased secure device until an ownership registration unit thereof is provided.

Therefore, there is a need of a method to ensure a license for a secure device so that a user can use the secure device within a predetermined use range even when the ownership thereof has not been established in the secure device of a home network having been provided with no ownership registration unit.

SUMMARY OF THE INVENTION

The present invention is conceived to solve the aforementioned problems. An aspect of the present invention is to ensure a license for an appropriate use range of contents of a secure network device even during the initial construction stage of a network, by granting a license for a non-secure use range of the secure network device in non-secure use mode through a non-secure use authorizing means even when the ownership thereof has not yet been established.

In the present invention, when a use request message is received from a user, it is determined through an ownership registration determining unit whether the ownership has been registered, and either a secure or non-secure use mode is then established based on the determination results.

Accordingly, it is ensured that the user can be granted a license for a secure device in a non-secure use range in non-secure use mode even when ownership has not yet been established.

The non-secure use range means a range that does not require establishment of security for contents, and may be defined by either a network device or a content developer, or may be edited by a user.

As an example, in case of multimedia contents, a publicly available version of multimedia contents, which are determined to be non-secure by an author as a content developer, may be set as a non-secure use range.

The remainder of the multimedia contents that require establishment of security except for the non-secure use range has its use range defined depending on a license granted by the ownership registration unit.

A network device available in a non-secure use mode according to an aspect of the present invention comprises an ownership establishment determination unit for determining whether ownership has been established in the network device and establishing either a secure or non-secure use mode, upon reception of a use request message from a user through a control unit; and a non-secure use range search unit for searching for a non-secure use range available in a non-secure use mode, if the ownership establishment determination unit determines establishment of the non-secure use mode, and granting the user a license for the searched non-secure range.

Further, the network device may further comprise a non-secure use approval determination unit for analyzing the use request message received from the user and determining whether the user has been authorized to use the non-secure use mode.

A method of ensuring use in a non-secure use mode according to another aspect of the present invention comprises the steps of determining whether ownership has been established in the network device and establishing either a secure or non-secure use mode, upon reception of a use request message from a user through a control unit; and if it is determined that the ownership has not been registered, searching for a non-secure use range available in non-secure use mode, and granting the user a license for the searched non-secure range.

Further, the method may further comprise the step of, if it is determined that the ownership has been registered, searching for a user's license in response to the use request message, and granting the user a license for a use range of the searched license.

BRIEF DESCRIPTION OF THE DRAWINGS

The above and other aspects and features of the present invention will become apparent from the following description of exemplary embodiments given in conjunction with the accompanying drawings, in which.

DETAILED DESCRIPTION OF THE INVENTION

Hereinafter, a network device and method thereof available in non-secure use mode according to the present invention will be described in detail with reference to the accompanying drawings.

Figure 1A:
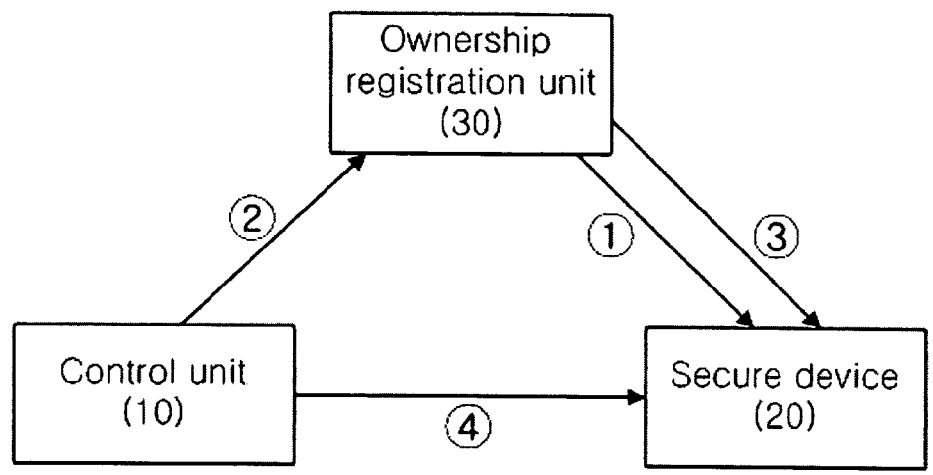
FIGS. 1a, 1b, and 1c schematically illustrate configurations of a conventional network system and a secure device, and the method of using the secure device, respectively.
Figure 1B:
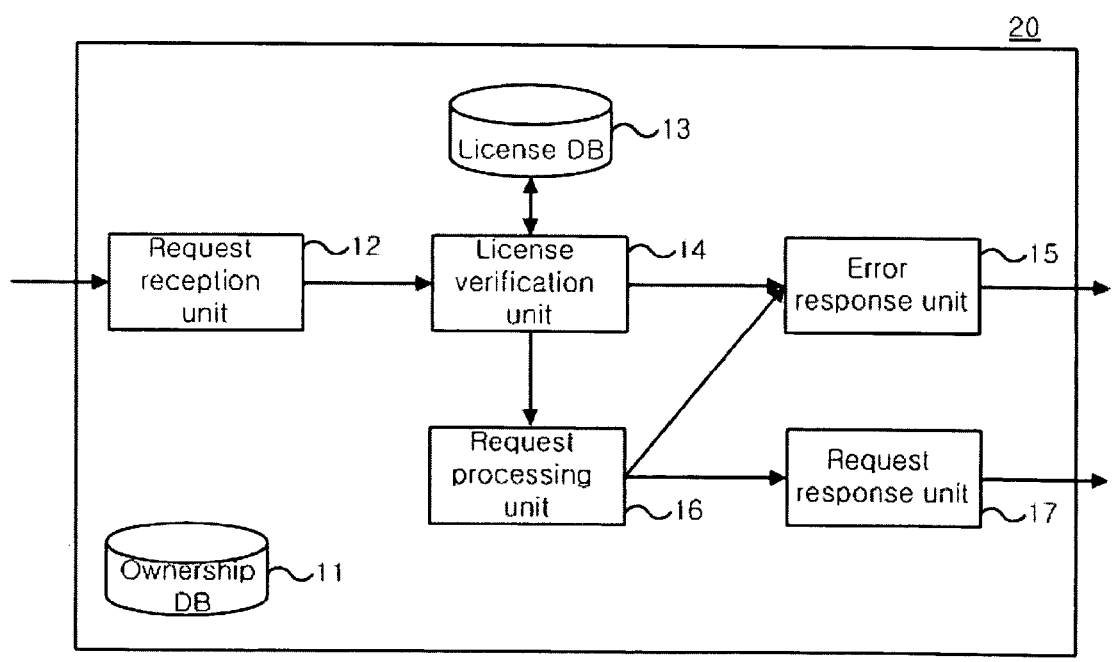
Figure 1C:
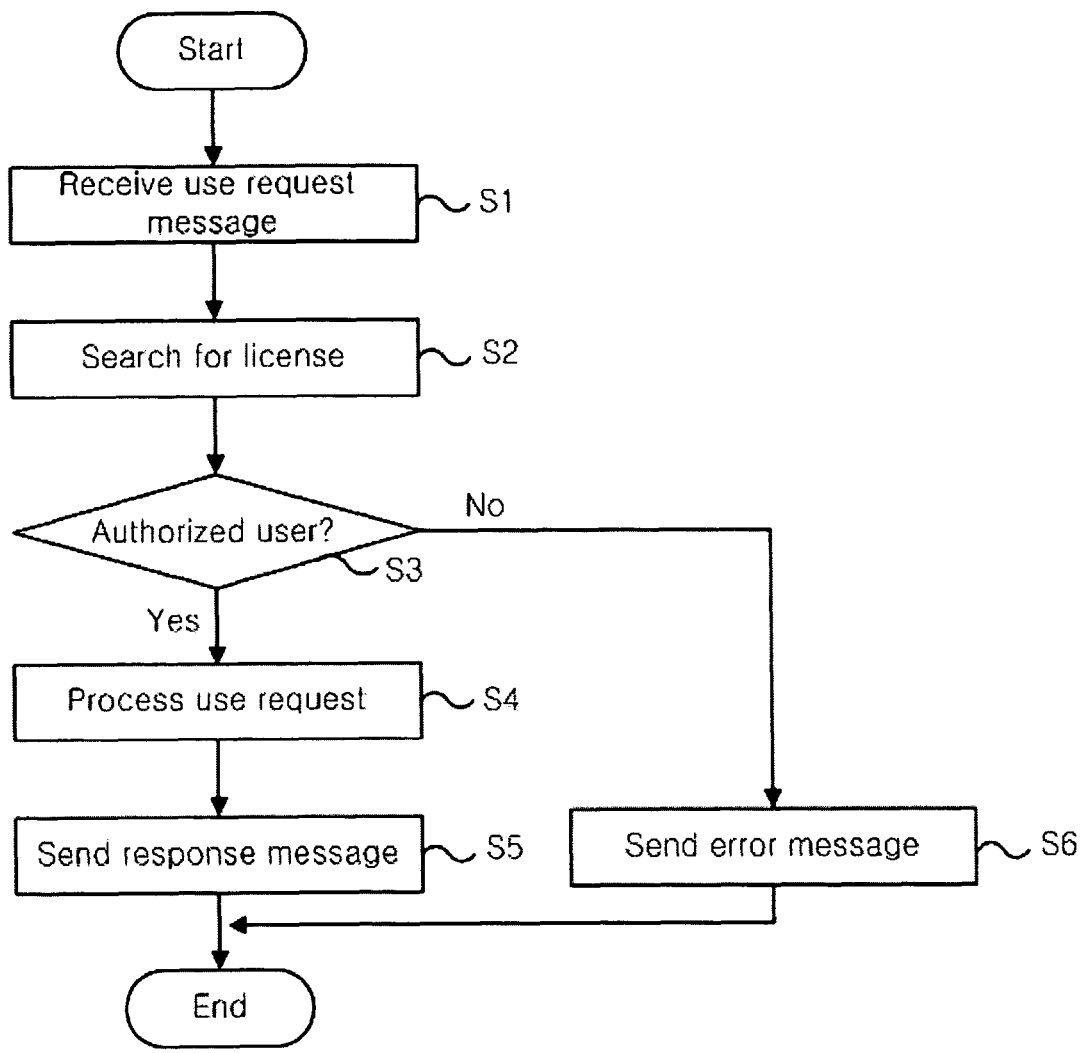
Figure 2:
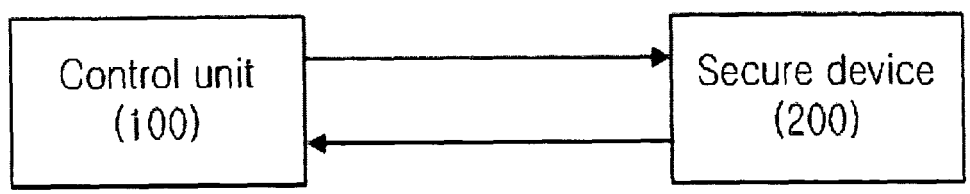
FIG. 2 schematically illustrates the configuration of a network system according to an embodiment of the present invention.

In the following description of the network device and method available in a non-secure use mode according to the present invention, the present invention will be described as being implemented on a home network. However, this is merely for illustrative purposes. It will be understood by those skilled in the art that various modifications and other equivalents thereof may be made to the method of providing a user with a license for an appropriate use range of contents of a secure network device in a state where ownership has not been established. FIG. 2 schematically illustrates the configuration of a network system according to an embodiment of the present invention.

As shown in FIG. 2, the network system according to the present invention comprises a control unit 100 for controlling network devices that are operated in connection with one another on a home network, and a secure device 200 whose ownership has not been established due to the absence of an ownership registration unit at the initial installation stage of the home network.

If the secure device 200 receives a use request message from a user through the control unit 100 while the ownership thereof has not been established in the secure device 200, the secure device ensures that the user can be granted a license for use within a non-secure use range under a non-secure use mode.

A secure use mode is a mode in which only users whose licenses have been registered through the ownership registration unit having ownership of the secure device 200 can use contents to thereby maintain security of the contents.

The non-secure use mode is a mode in which any user can use contents in a non-secure use range even when the ownerships thereof have not been established.

The non-secure use range means a range that does not require establishment of security for contents, and may be defined by either a network device or a content developer, or may be edited by a user.

As an example, in the case of multimedia contents, a publicly available version of multimedia contents, which is determined to be non-secure by an author who is a content developer, may be set as falling under a non-secure use range.

The remainder of the multimedia contents that require establishment of security except for the non-secure use range, has its use range defined depending on a license granted by the ownership registration unit.

Figure 3:
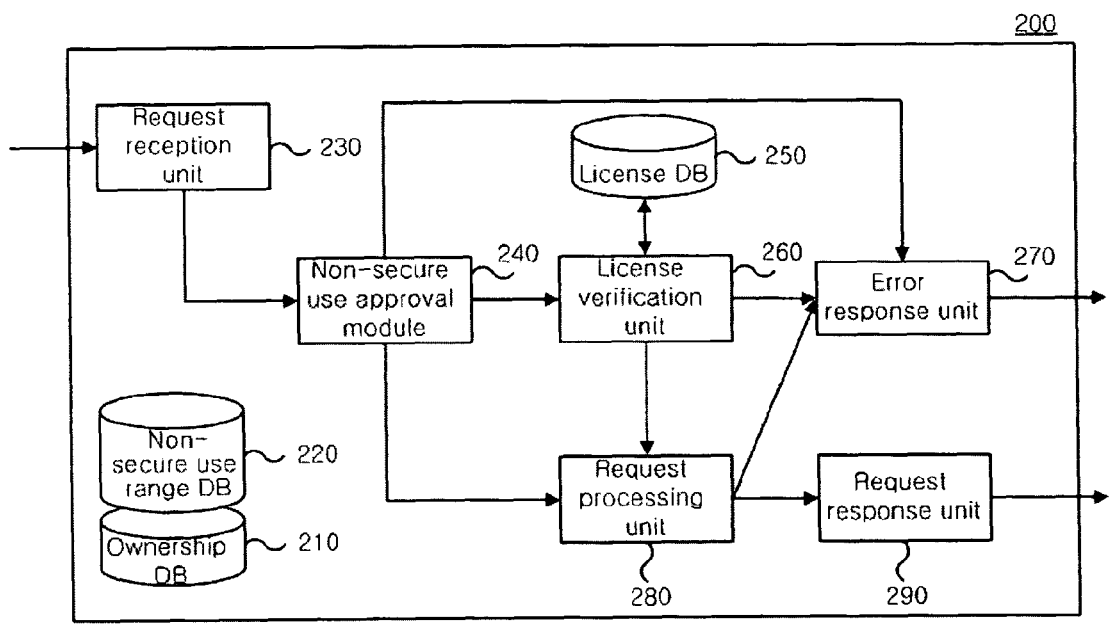
FIG. 3 schematically illustrates the configuration of a secure device available for use under non-secure mode according to an embodiment of the present invention.

FIG. 3 schematically illustrates the configuration of a secure device available in non-secure use mode according to an embodiment of the present invention.

As shown in FIG. 3, the secure device 200 comprises an ownership database (DB) 210 for storing ownerships provided by an ownership registration unit; a non-secure use range database (DB) 220 for storing information on a range of contents to be provided in non-secure use mode; a request reception unit 230 for receiving a request for use of specific content, which is issued as a user's attempt to access the content through a control unit; a non-secure use approval module 240 for determining whether the ownership has been established and establishing either a secure or non-secure use mode in response to the user's request received by the request reception unit 230 through the control unit 100; a license database (DB) 250 for storing licenses granted by the ownership registration unit having ownership; a license verification unit 260 for authenticating a user's license in a secure use mode through the license DB 250 based on the determination results of the non-secure use approval module 240; an error response unit 270 for sending an error message, which is generated based on the license authentication results of the license verification unit 260, to the user; a request processing unit 280 for processing the user's request when a license in a secure use mode is authenticated or the use in the non-secure use mode is authorized in accordance with the determination results of the non-secure use approval module 240; and a request response unit 290 for sending a request responding message generated, based on the processing results of the request processing unit 280.

Figure 4:
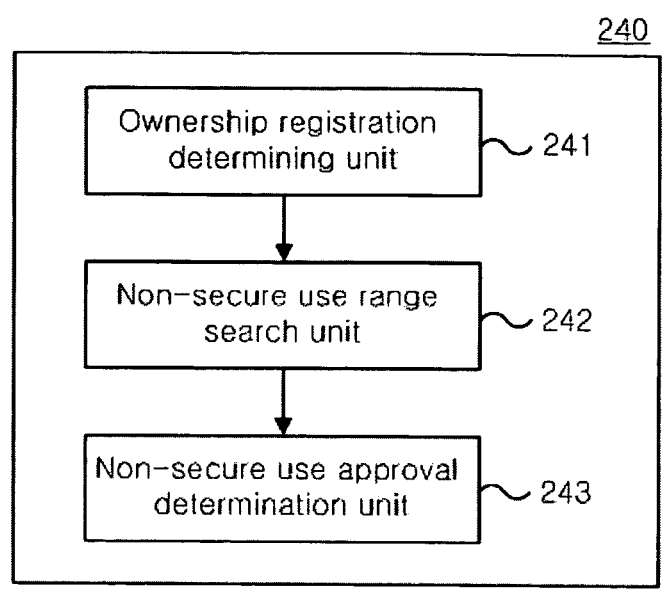
FIG. 4 schematically illustrates the configuration of a non-secure use approval module shown in FIG. 3.

FIG. 4 schematically illustrates the configuration of the non-secure use approval module 240 shown in FIG. 3.

As shown in FIG. 4, the non-secure use approval module 240 processes the use request message received from the user by determining, based on the condition of the ownership establishment, whether a use mode to be provided to the user is either a secure or non-secure use mode. The non-secure use approval module 240 comprises an ownership registration determining unit 241, a non-secure use range search unit 242, and a non-secure use approval determination unit 243.

The ownership registration determining unit 241 determines whether the ownership registration unit 241 has registered its ownership in the secure device 200, by referring to ownership registration information stored in the ownership DB 210. If the ownership has been registered, the ownership registration determining unit 241 determines an establishment of the secure use mode. If not, it determines an establishment of the non-secure use mode.

If the ownership registration determining unit 241 determines the establishment of non-secure use mode, the non-secure use range search unit 242 searches for a non-secure use range that can be provided to the user in non-secure use mode, by referring to the non-secure content registration information stored in the non-secure use range DB 220.

The non-secure use approval determination unit 243 is further provided to perform user authentication for a user who has a license for the secure device in the non-secure use range through the ownership registration determining unit 241 and the non-secure use range search unit 242, and determines whether the user has been authorized to use contents in non-secure use mode.

That is, the non-secure use range searched by the non-secure use range search unit 242, and the requested contents of the use request message sent from the user through the control unit are analyzed. Then, it is determined whether the user has been authorized to use the secure device 200 in non-secure use mode, depending on whether the requested contents exceed the non-secure use range.

As an example, if the requested contents of the use request message exceed the searched non-secure use range, it is determined that the user has not been authorized to use the secure device 200 in non-secure use mode, and an error message is sent to the user.

For reference, in the non-secure use approval module of the secure device available for use in non-secure use mode according to the embodiment of the present invention, all of respective sub-modules of the module may be implemented in hardware or software, or some of them may be implemented in software.

Therefore, the non-secure use approval module of the secure device available for use in non-secure use mode according to the embodiment of the present invention may be implemented in hardware or software within the scope of the present invention, and it will be apparent that various modifications and changes may be made thereto upon implementing it in hardware and/or in software without departing from the scope of the present invention.

A method of ensuring use of contents in non-secure use mode, which employs the non-secure use approval module of the secure device available for use in non-secure use mode, will be described in detail with reference to the accompanying drawings.

Figure 5:
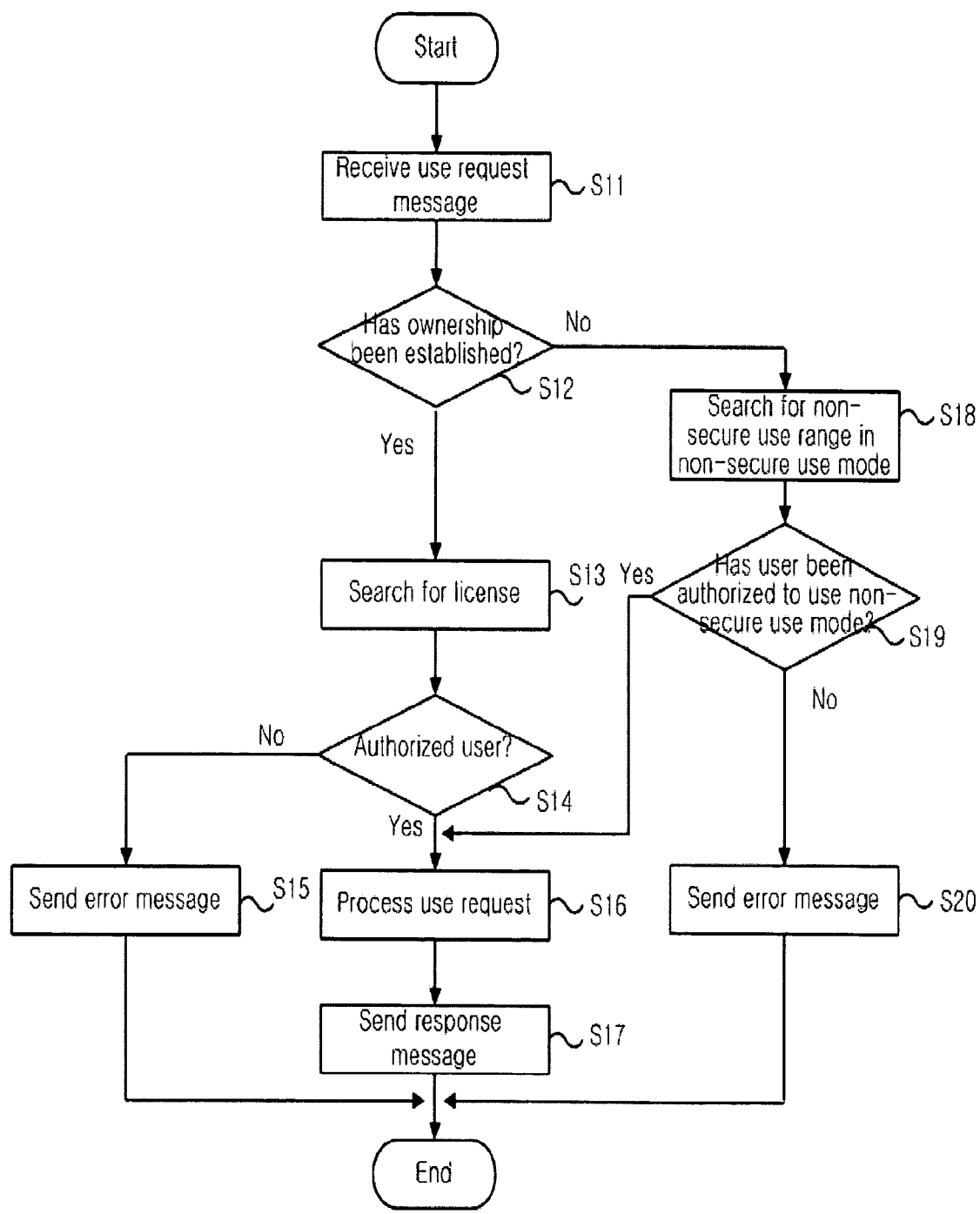
FIG. 5 schematically illustrates a non-secure use method according to an embodiment of the present invention.

FIG. 5 schematically illustrates a non-secure use method according to an embodiment of the present invention.

As shown in FIG. 5, when a user first sends a use request message through the control unit to receive any desired content (S11), the secure, device determines whether the ownership has been established therein, through the ownership registration determining unit 241 of the non-secure use approval module 240, by referring to the ownership registration information stored in the ownership DB 210 (S12).

If it is determined that the ownership has been established, the ownership registration determining unit 241 determines the secure use mode as a use mode to be provided to the user who has sent the use request message.

Then, the license verification unit 260 searches for a license of the user who has sent the use request message by referring to the license registration information stored in the license DB 250 (S13), and then determines based on the search results whether the user has been authorized (S14).

In other words, it is determined whether the user has been authorized, by determining whether the requested contents of the use request message received from the user exceed a use range of the searched license.

If it is determined that the user is not an authorized user, an error message is sent to the user (S15). If the user is an authorized user, the request processing unit 280 processes the request of the received use request message (S16), and sends a response message to the user (S17).

If an error occurs in processing the request, an error message is sent to the user.

If it is determined that the ownership has not been established, the ownership registration determining unit 241 determines the non-secure use mode as a use mode to be provided to the user who has sent the use request message.

Subsequently, the secure device searches for a non-secure use range, which can be provided to the user in non-secure use mode, through the non-secure use range search unit 242 of the non-secure use approval module 240, by referring to the non-secure content registration information stored in the non-secure use range DB 220 (S18).

Thereafter, in order to determine whether the user has been authorized to use the content in non-secure use mode, the secure device 200 determines through the non-secure use approval determination unit 243 whether the user has been authorized to use the content in non-secure use mode while ownership has not been registered, by analyzing an inclusion relationship between the searched non-secure use range and the requested content of the use request message sent by the user (S19).

In other words, the determination on whether the user has been authorized to use the content in non-secure use mode is made by determining whether or not the requested contents of the use request message received from the user fall within the searched non-secure use range.

If it is determined that the user has not been authorized to use the content in non-secure user mode, an error message is sent to the user (S20). If it is determined that the user has been authorized to use the content in non-secure use mode, the method returns to routine S16 in which the request processing unit 280 processes the request of the received use request message.

The method of ensuring use of contents in non-secure use mode according to the present invention will be described in connection with one embodiment.

When a user installs a multimedia player which is adapted to download multimedia content provided by a multimedia content owner and to play the multimedia content on the home network during an initial installation stage of a home network, a security function has been established in the multimedia player so that only authorized users can use the multimedia content according to available features of the content.

In such a case, since the home network of the user remains at the initial installation stage in which an ownership registration unit for registering the ownership of the secure multimedia player has not yet been provided, the user cannot register his ownership of the multimedia player.

If the user intends to confirm specific multimedia content available for a newly purchased multimedia player in such a home network, the user sends a use request message to the multimedia player through a predetermined control unit 100 so that the user can gain access to the multimedia player.

The multimedia player determines whether its ownership has been established, through the ownership registration determining unit 241 of the non-secure use approval module 240, in order to provide the multimedia content to the user in response to the received use request message.

Since it is determined that ownership has not been established at this time, the non-secure use approval module 240 determines establishment of the non-secure use mode and searches for registered information on a non-secure use range stored in the non-secure use range DB 220 through the non-secure use range search unit 242.

Then, if a range of the multimedia content available in non-secure use mode is searched for, it is determined whether the user has been authorized to use the multimedia content within the non-secure use range, by analyzing whether the requested content of the use request message fall within the searched range of multimedia content.

That is, if registration information relative to a non-secure use range available in non-secure mode has been set to free content as designated by a multimedia content owner, it can be determined whether the user has been authorized to use the content in non-secure use mode, through reception of a password set in the multimedia player from the user or through multimedia content requested by the user.

If it is determined that the user has been authorized to use the content in non-secure use mode, the content falling within the non-secure use range is provided to the user.

By means of the method described above, the user can use the multimedia content falling within the non-secure use range through the multimedia player, even when it is difficult to establish the ownership of a newly purchased secure device during the initial installation stage of the home network.

According to the present invention described above, there is an advantage in that a license for an appropriate range of contents of a secure network device can be granted to a user even during the initial installation stage of a home network.

Although the present invention has been described in connection with the embodiments illustrated in the drawings, it is merely for illustrative purposes. It will be understood by those skilled in the art that various modifications and other equivalents thereof may be made thereto. Therefore, the technical spirit and scope of the present invention should be defined by the appended claims.

What is claimed is:

1. A network device available for use in secure use mode and non-secure use mode, comprising:
    a memory configured to store non-secure content information;
    an ownership registration determining unit configured to determine whether an ownership has been established in the network device and establishes either a secure use mode or a non-secure use mode in response to a use request message received from a user, wherein the ownership registration determination unit establishes the non-secure use mode if it is determined that the ownership has not been established in the network device; and
    a non-secure use range search unit configured to search for a non-secure use range of content available in the non-secure use mode by referring to the stored non-secure content information and generates a searched non-secure use range, if the ownership registration determining unit determines an establishment of the non-secure use mode, wherein the network device grants the user a license authorizing the user to use non-secure content falling within the searched non-secure use range.

2. The device as claimed in 1, further comprising a non-secure use approval determination unit configured to analyze the use request message received from the user and determines whether the user has been authorized to use the non-secure content under the non-secure use mode.

3. A method of ensuring use of a network device which is a hardware device in non-secure use mode, the network device being available for use in secure use mode and non-secure use mode, comprising:
    determining, by the network device, whether an ownership has been established in the network device and establishing either a secure use mode or a non-secure use mode in response to a use request message received from a user, wherein the non-secure use mode is established if it is determined that the ownership has not been established in the network device; and
    searching, by the network device, for a non-secure use range of content available in the non-secure use mode by referring to stored non-secure content information, generating a searched non-secure use range, and granting the user a license authorizing the user to use non-secure content falling within the searched non-secure use range if it is determined that the ownership has not been registered.

4. The method as claimed in claim 3, further comprising searching for a user's license in response to the use request message, generating a searched license, and granting the user a license within a use range of the searched license if it is determined that the ownership has been registered.

5. The method as claimed in claim 3, wherein the granting the user the license within the searched non-secure use range comprises comparing the searched non-secure use range with a content of the use request message sent by the user, and determining whether the user has been authorized to use under the non-secure use mode.

6. The device as claimed in claim 2, wherein the use request message is received through a control unit.

7. The method as claimed in claim 3, wherein the use request message is received through a control unit.

8. A tangible non-transitory computer-readable medium for recording a computer program embodied thereon, the program being executable by a computer processor and enabling the computer processor to perform a method of ensuring use of a network device in non-secure use mode, the network device being available for use in secure use mode and non-secure use mode, the method comprising:
- determining whether an ownership has been established in the network device and establishes either a secure use mode or a non-secure use mode in response to a use request message received from a user, wherein the non-secure use mode is established if it is determined that the ownership has not been established in the network device; and
- searching-for a non-secure use range of content available in the non-secure use mode by referring to stored non-secure content information, generating a searched non-secure use range and granting the user a license authorizing the user to use non-secure content falling within the searched non-secure use range if it is determined that the ownership has not been registered.

9. The computer readable medium of claim 8, further comprising searching for a user's license in response to the use request message, generating a searched license, and granting the user a license within a use range of the searched license if it is determined that the ownership has been registered.

10. The computer readable medium of claim 8, wherein the granting the user the license within the searched non-secure use range comprises comparing the searched non-secure use range with a content of the use request message sent by the user, and determining whether the user has been authorized to use under the non-secure use mode.

11. The device as claimed in claim 1, wherein the non-secure content comprises multimedia content.

12. The method as claimed in claim 3, wherein the non-secure content comprises multimedia content.

13. The computer readable medium of claim 8, wherein the non-secure content comprises multimedia content.

* * * * *